(12) United States Patent
Yang

(10) Patent No.: US 7,797,276 B1
(45) Date of Patent: Sep. 14, 2010

(54) INTEGRATED DATABASE DATA EDITING SYSTEM

(76) Inventor: Guang Yang, 1501 W. Hillsdale Blvd., #209, San Mateo, CA (US) 94402

(*) Notice: Subject to any disclaimer, the term of this patent is extended or adjusted under 35 U.S.C. 154(b) by 2384 days.

(21) Appl. No.: 09/677,493

(22) Filed: Oct. 2, 2000

(51) Int. Cl.
*G06F 17/30* (2006.01)

(52) U.S. Cl. ........................ 707/636; 707/634

(58) Field of Classification Search ............ 707/3, 707/500, 513, 501.1, 4, 1, 100, 10; 345/723; 703/3, 4, 500
See application file for complete search history.

(56) References Cited

U.S. PATENT DOCUMENTS

| | | | | |
|---|---|---|---|---|
| 5,644,739 | A | * | 7/1997 | Moursund ............... 345/840 |
| 5,675,752 | A | * | 10/1997 | Scott et al. ............. 707/500.1 |
| 5,801,701 | A | * | 9/1998 | Koppolu et al. ............ 707/1 |
| 5,815,665 | A | * | 9/1998 | Teper et al. .............. 709/229 |
| 5,864,682 | A | | 1/1999 | Porter et al. ........... 395/200.77 |
| 5,875,448 | A | | 2/1999 | Boys et al. .............. 707/531 |
| 5,950,207 | A | | 9/1999 | Mortimore et al. ......... 707/104 |
| 6,005,560 | A | * | 12/1999 | Gill et al. ............... 715/500.1 |
| 6,035,309 | A | | 3/2000 | Dauerer et al. ............ 707/503 |
| 6,104,334 | A | * | 8/2000 | Allport ................. 341/175 |
| 6,105,055 | A | | 8/2000 | Pizano et al. ............ 709/204 |
| 6,256,773 | B1 | * | 7/2001 | Bowman-Amuah ......... 717/121 |

* cited by examiner

*Primary Examiner*—Baoquoc N To (57) ABSTRACT

An integrated database data editing system for editing and managing the relational database data contents remotely through intranet or Internet in an efficient and easy-to-use manner. The editing system is used to input, output, modify and update the database data and is extremely useful for editing the large database objects such as large text files and audio, image, animation and video binary data files from a remote database. The editing system contains a visual database data manager in the client computer, which includes a list of databases and database tables from the remote server computer, and a database designer, an entity relationship designer, a table designer, a database schema, a data filter and an SQL console. The data table cells displayed on the client computer are default as read only. It is directly modified and edited when single-clicked by the mouse. A small icon is used as a place holder in the table cell for large text or binary data type. When double-clicked by the mouse, a commercial text or multimedia editor is popped up and the large text or binary data is retrieved from the remote database into the data editor for editing. The client/server version of the system is deployed and run on intranet. The web version is deployed and run on Internet and also on intranet. The web version has more advantage to implement the security features by using the Public Key Infrastructure (PKI) and the Secure Socket Layer (SSL). The mechanisms for user authentication and access control to the remote database are well implemented.

5 Claims, 4 Drawing Sheets

INTEGRATED DATABASE DATA EDITING SYSTEM

FIELD OF THE INVENTION

This invention relates to the field of computer database data integrated editing system, more specifically to a novel system and methods, which remotely edits and manages the relational databases through either wired or wireless intranet or Internet.

BACKGROUND OF THE INVENTION

The present invention is directed to a novel integrated database data editing system, which uses the visual environment and the GUIs (Graphical User Interfaces) and tools in a client computer to remotely access and directly edit and manage the relational database data contents in a server computer in an efficient and easy-to-use manner through the computer networks. Computer networks are the networking systems that link a plurality of computers with electric wires and work together through the standard network protocols. All the computers linked on the networks work together in a client/server manner. The computer servers provide application services to a plurality of computer clients, and the client computers access and utilize these services through the networks. Each computer linked on the networks has a unique network interface with a unique IP (Internet Protocol) address. Typically, a home computer is connected to the Internet or other networks through a computer modem or DSL (Digital Subscribe Line). The corporation computers are usually connected to the corporation private networks or Internet through the computer network adapters. The personal computer, laptop computer, smartphone, other portable and hand-held computer device can be connected to the WLAN (Wireless Local Area Network) and Internet through the wireless gateways by using Wi-Fi (802.11 networking) or WiMAX (Worldwide Interoperability for Microwave Access) technologies. The intranet is the private network of a corporation or government agency including the LAN (Local Area Network) and WAN (Wide Area Network). The Internet is the "Inter-networks" that links all the sub-networks (intranets) together through a plurality of Internet routers and standard Internet protocols. Typically, the intranets are linked to the Internet through a firewall or a computer proxy server, which only allows a group of pre-selected Internet protocol data flows to pass through.

An intranet uses the network management software such as Microsoft Windows NT or Novell Netware to directly link the computers together, where each computer linked on the intranet has an IP address or a name unique for the network. The client computers communicate with the server computers through the standard network protocols. The TCP/IP (Transfer Control Protocol/Internet Protocol) is the basic and most popular network protocol for the intranet and also for all the other computer networks. The TCP/IP is a "connection-oriented" network protocol. When a client computer requests a service from a server computer or the server computer replies to the client computer, the TCP first establishes a connection between the client and the server, and then the IP transfers the datagrams between the client and the server. When the data transmission is finished, the TCP terminates the connection. The TCP/IP connects and transfers datagrams between the client computer and the server computer based on the IP addresses of the client and server computers that are unique for the network. The computer IP addresses are managed by the computer network management software.

Internet links all the private networks together through the computer network routers and firewalls, and provide us such an efficient way to communicate with our neighbors, our corporation branch offices or the people living on another continent anytime and anywhere. An Internet router maintains a dynamic routing table that contains the globally registered IP addresses of all the computer nodes linked on the Internet, and forwards the IP datagrams based on the source host and destination host computer IP addresses carried on these datagrams. The client computers and server computers linked on Internet communicate with each other through the standard TCP/IP based Internet protocols such as HTTP (HyperText Transfer Protocol), FTP (File Transfer Protocol), SMTP (Simple Mail Transfer Protocol), EDI (Electric Data Interchanger) or other RPC (Remote Procedure Call) based Internet protocols. Each computer node linked on the Internet, including the client computer, server computer and router, has at least one globally registered IP address or URL (Universal Resource Locator). The computers find and communicate with each other based on these unique IP addresses or URLs. The HTTP is an Internet application protocol built on the above of TCP/IP for the communication between a client computer browser and an HTTP server (or web server) installed in a server computer in a request/response two-way communication manner. The client browser sends out the requests through Internet to the server computer HTTP server, and the HTTP server replies to the client browser through the CGI (Common Gateway Interface). The CGI is the standard interface of an HTTP server for the request/response communication between the browser and the HTTP server. The WWW (World Wide Web) web pages are the most popular computer software applications used for communications between a client computer browser and a web server of a computer server through Internet and also intranet. A numerous web sites have been built based on the web pages and the HTTP. The FTP comprises a FTP server that is hosted in a server computer and a FTP client that is hosted in a client computer. The FTP server is used to store data files where the FTP clients can upload or download the data files through the intranet or Internet. The SMTP is a message-based Internet protocol that is used to transfer e-mails between the computer e-mail servers. The EDI is also a message-based protocol to transfer data files between the EDI client computer and the server computer. The RPC is used to implement the communication applications in a caller/listener manner between any client computers and server computers coupled on the intranet or Internet.

Computer relational database is the central data repository place for most software applications, and is widely used in most client/server enterprise software applications and web applications. Typically, a relational database application is installed in a computer server and is accessed and used by a plurality of computer clients coupled on the networks. The client/server enterprise database application is typically in the "two-tier" software architecture and is used inside the private corporation intranet, where the client computer communicates with the server computer that contains the database through a numerous client/server socket links. The web database application is typically in the "three-tier" software architecture and is used for Internet application, where the client browser communicates with the web server and application server through HTTP, and the web server and application serve communicates with the database. The client/server software applications can only run inside the intranet but not the Internet because the intranet is protected by the firewall and the numerous socket links between the client computer and the server computer cannot pass through the firewall. Further more, the IP addresses of the client and server computers need to be globally registered for the Internet database applications.

In a database software application, a database is called the "back-end" that works independently and uses the standard SQL (Structured Query Language) to communicate with the software logic "middle-ware" and the presentation "front-end" through the DBMS (DataBase Management System). A relational database stores data temperately or permanently and in most cases the database data needs to be dynamically input, output, modified or updated frequently and timely. The data stored in all the relational databases are simple text data or binary data types that are universal for all the computer platforms and the relational databases. In most business applications, especially the Internet e-commerce applications such as product catalogue or product advertisement, the data stored in the database is not only the small text or character data, but also more likely the large text or binary data types, such as large text file, voice, audio, music, image, picture, animation, video or compiled software program. One of the best practices for database software applications is to separate the data content from the data presentation, where the data content is stored in the relational database and then retrieved by the "middle-ware" and passed to the Windows Graphic User Interface (GUI) or web page for display.

All the commercial relational databases support the small text data type. Some major commercial relational databases, such as Oracle database and IBM DB2, also support the Large Object (LOB) data types including the Character Large Object (CLOB) and the Binary Large Object (BLOB). The CLOB data type supports text (ASCII, 8-bit) or character (16-bit) data, and the BLOB data type supports multimedia data such as audio, image, animation, video, compiled software program, etc. Further more, the Oracle database also supports LONG, LONG RAW, NCLOB and BFILE data types. The LONG stands for text or character data. The LONG RAW stands for long binary data. The NCLOB is for multi-byte character set. The BFILE stands for Binary File that is stored outside the database but coupled with a file path stored inside the database. The DB2 supports DBCLOB data type, which stands for Double-Byte Character Large Object. All of the LOB data types can store the data size up to 2 Gigabytes or 4 Gigabytes, and the data is stored either inside the database or outside the database as "out-of-line" data. The DataBase Management System (DBMS) of a relational database uses a Locator that is stored inside the database to refer or point to the actual data when the data is stored either as a separate data set or outside the database. The LOB data values are manipulated and processed by the DBMS using the built-in specific functions and procedures, which is very difficult to use and to handle these large data types even for the computer software professionals.

Most relational database vendors sell their databases independently. Some of them sell the databases with a simple tool or employ the third party products to manage their databases. These client side tools provide the GUIs to write the individual SQL or SQL*Plus codes to access and manage the databases inside the intranet. None of them can work on the Internet because the client and server computers need to use the HTTP to communicate each other for Internet applications. There are also some commercial database reports software products available on the market, which can access and read the database data through intranet or Internet, but all of these database reports products are the "read only" software. None of them can update, modify or input, output the data for the database. As will be described, the present invention provides an integrated database data editing system that is used to remotely access the relational database to manage the database and to modify, update, input or output the database data contents including the large data types through either the wired or wireless intranet or the Internet.

SUMMARY OF THE INVENTION

This invention is directed to an integrated database data editing system that provides a visual environment, graphic user interfaces and tools in a client computer to remotely access the relational database and to manage and edit the database data contents in a server computer. The database data editing system is used to input, output, modify and update the database data contents in an efficient and easy-to-use manner, and is extremely useful for editing large database objects such as large text files and audio, image, animation and video binary data files.

The database data editing system comprises a computer client and a computer server containing a relational database that supports the large data objects. The client computer is either a personal computer, laptop computer, smartphone, or other portable or hand-held computer device. The server computer is a personal computer, midrange computer or mainframe computer. The client and server computers are linked on either wired or wireless intranet or Internet and communicate with each other by using TCP/IP (Transfer Control Protocol/Internet Protocol) based network protocols through a single computer port or a set of computer ports. The client computer sends query to the database of the server computer through the networks to retrieve a set of data, and then materializes the data to display on the client computer screen either as the Windows Graphic User Interface (GUI) forms or web pages. The database table displayed on the client screen is defaulted as "read-only". When the mouse "single-clicks" on a table cell, the text data of the cell can be directly edited by the actions of inserting, overwriting, deleting, copying, and pasting. A small icon as a place-holder is displayed first on default for the large text data and binary data types. When the mouse "double-clicks" the table cell icon, a commercial or implemented data editor installed on the client computer is popped up depending on the data type of the cell. If the data is the large text or character data type, a text editor pups up. If the data is the large binary data type, a multimedia data editor, such as a music, voice, image, picture, animation or video editor, pops up. A list of the data editors installed on the client computer is also provided to the user for selection. The data file is automatically uploaded into the data editor and is edited by using the facilities provided by the editor. When the data editing is completed, the data file is directly saved and transferred back to the remote original database through the networks.

The client computer contains a Database Data Manager GUI that comprises a Header Panel and a Detail Panel as well as the Menu lists and Icon buttons on the top of the form. The Header Panel lists the databases and the database tables. The Detail Panel lists several major tools including the DB Designer, Entity Relationship (ER) Designer, Table Designer, Database Schema, Data Filter, SQL Console, etc. When a database name listed on the Header Panel is double-clicked, the Detail Panel is displayed for the database. The DB Designer is used to create and design the database and the tables. The ER Designer is used to design and edit the database entity relationship. The Table Designer is used to design and edit the table data structure. The DB Schema edits and displays the database data structure and micros. The Data Filter is used to select a subset of the data from a table or tables of the remote database. The SQL Console is used to write and execute SQL query directly to the remote database.

There are two implement versions for the integrated database data editing system, a client/server version and a web version. The client/server version is deployed and run on the intranet. The client computer Database Data Manager Window GUIs are implemented by using Java, Visual C++, Visual Basic, or other related computer languages. The client computer communicates with the server computer by using TCP/IP based network protocols through a single computer port or a set of computer ports, or alternatively by using UDP/IP (User Datagram Protocol/Internet Protocol) based protocols. The query and data is transferred by SQL (Structured Query Language) through JDBC/ODBC (Java DabaBase Connection/Open DataBase Connection) bridge between the application server and the server database.

The web version of the data editing system consists of a client computer with an Internet browser and a server computer containing a web server, an application server and a relational database. The client browser communicates with the web server and application server by using TCP/IP, HTTP and other network protocols through a single computer port or a set of computer ports through the Internet. The web pages are implemented by HTML (HyperText Markup Language), DHTML (Dynamic HTML), XML (eXtensible Markup Language), JavaScript, Ajax (Asynchronous JavaScript and XML), Java Applets and other Plugins. The Java Servlets, Java ServerPages and JavaEE (Java Enterprise Edition) are used to implement the middle ware, and the SQL and JDBC/ODBC are used to retrieve and transfer data from the database by the web server and application server.

The client computer Database Data Manager web pages, similar to the Windows GUI Database Data Manager of the client/server version, comprise a Header Frame and a Detail Frame. When the user clicks a table name on the Header Frame table list, a new web page containing the table data is displayed. The data on the table cell is default as read-only. When the user single-clicks a cell, the data is directly edited. When the user double-clicks the small icon of the cell for the large text or binary data types, a commercial or implemented data editor installed on the local client computer pops up and the data is downloaded from the remote database into the editor. When the user finishes the data edition, the data is directly sent back to the original database through the Internet.

The user authentication and access control mechanisms are well implemented to identify the users. The web version of the integrated database data editing system has more advantages compared to the client/server version. The firewall is used to protect the computer server that contains the database and the web server and application server. The PKI (Public Key Infrastructure) and SSL (Secure Socket Layer) are used to implement the security features of the web version. Further more, the web version can be deployed and run on any other network systems beside the Internet.

DETAILED DESCRIPTION OF THE INVENTION

This invention represents an integrated database data editing system that provides a visual environment, graphic user interfaces (GUIs) and tools in a client computer to remotely access a server computer containing a relational database to edit and manage the database contents in an efficient and easy-to-use manner through the wired or wireless networks. The database editing system is used to modify, update, input and output the relational database data and to manage the database, which is extremely useful for editing large database objects such as large text file, audio, music, image, picture, animation and video binary data files by using the incorporated commercial or implemented text and multimedia editors installed on the client computer.

Figure 1:
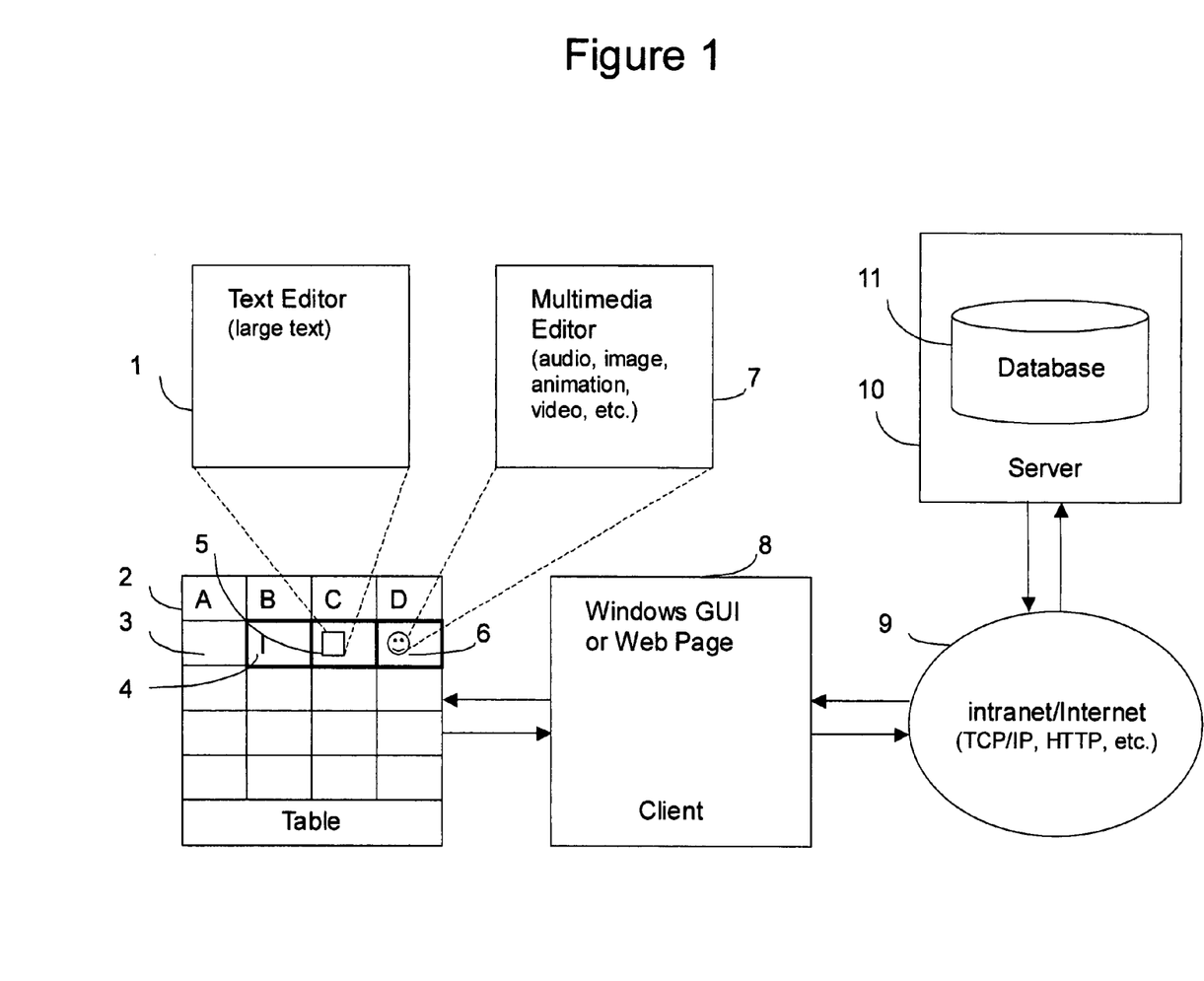
FIG. 1 is a general schematic representation of the integrated database data editing system.

FIG. 1 demonstrates that the database data editing system consists of a computer server 10 containing a relational database 11 that supports large text and binary data objects and a computer client 8 supporting the graphic user interfaces. The client computer is either a personal computer, laptop computer, smartphone, or other portable or hand-held computer device, which is connected to the networks by wired adaptor or DSL (Digital Subscribe Line) or connected wirelessly to the WLAN (Wireless Local Area Network) and Internet through the wireless gateways by using Wi-Fi (802.11 networking) or WiMAX (Worldwide Interoperability for Microwave Access) technologies. The server computer is a personal computer, midrange computer or mainframe computer. The server computer and client computer are linked on either wired or wireless intranet or Internet 9. For the intranet application, the client computer contains a Microsoft Windows or other computer operation system that provides the graphic user interfaces. The server computer contains a relational database that supports the large text and binary data types. The client computer communicates with the server computer through the TCP/IP (Transfer Control Protocol/Internet Protocol) based network protocols through a single computer port or a set of computer ports, or alternatively the UDP/IP (User Datagram Protocol/Internet Protocol) based protocols. For Internet application, the client computer contains an Internet browser FIG. 4 (69) with the Microsoft Windows or other computer operation system. The server computer contains a relational database that supports the large text and binary data types and an HTTP server (or web server) and an application server FIG. 4 (71) that communicates with the client computer browser by using HTTP or TCP/IP through a single computer port or a set of computer ports.

Figure 3:
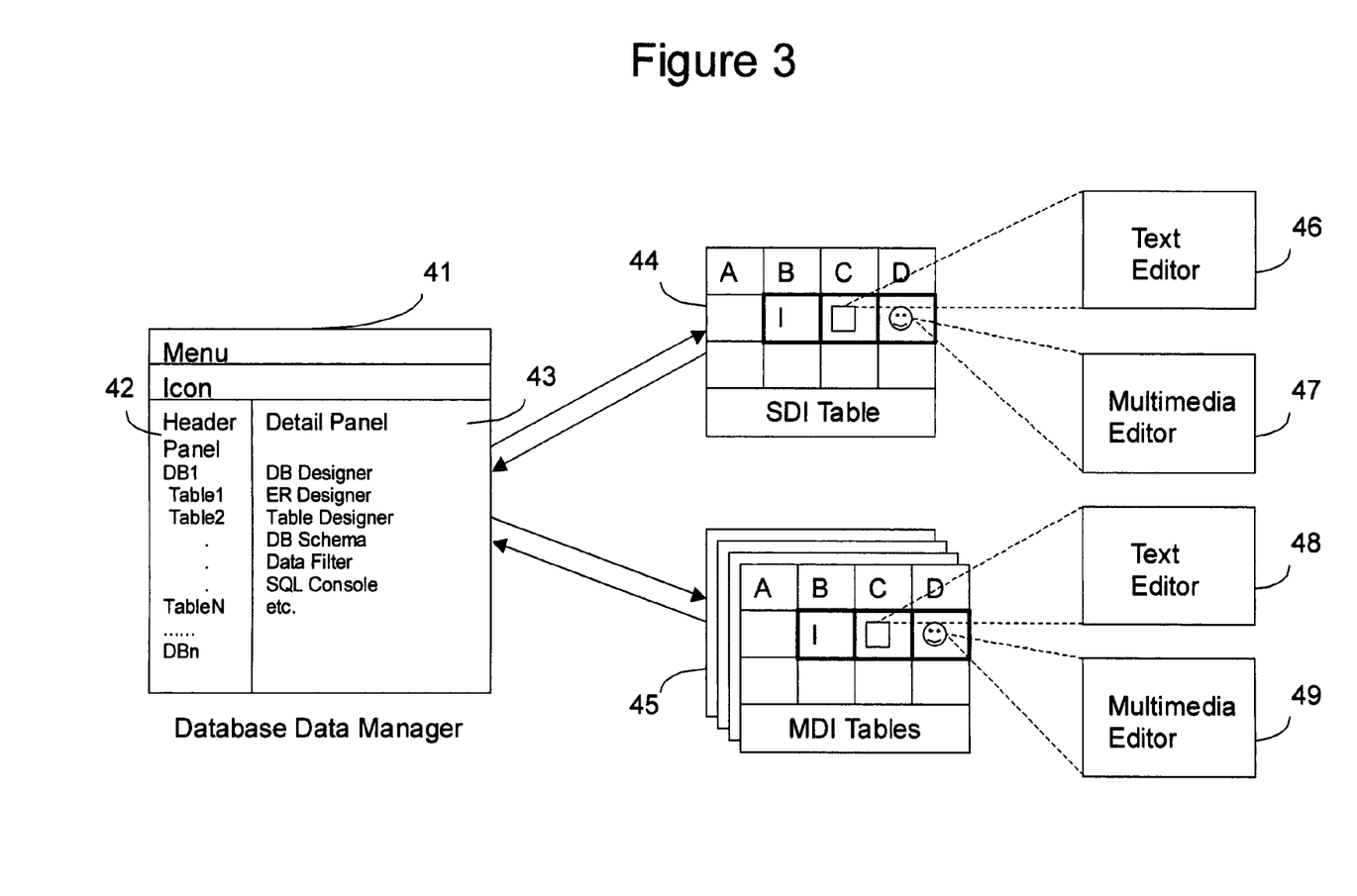
FIG. 3 is a schematic representation of the detail mechanisms and Windows GUI forms of the client/server version of the integrated database data editing system.

In the present invention, the client computer contains a Database Data Manager user interface FIG. 3 (41) that provides the necessary visual environment and tools to edit and manage the database data contents and is either installed permanently or downloaded by the browser on the client computer from the server computer. The client computer 8 sends a query to the remote server database 11 through the networks 9 to retrieve a set of the data. The database data is returned from the remote database to the client, and then materialized to display on the client screen either as the Windows Graphic User Interface (GUI) forms or web pages. The cells 3 of database table 2 displayed on the client computer screen are defaulted as read-only. The large text data type and binary data type are represented by the small icons 5, 6 as the place holders. When the mouse "single-clicks" a table cell 4, the small text data of the cell is directly modified by the action of inserting, overwriting, deleting, copying and pasting. When the mouse "double-clicks" an icon of the table cell 5, 6, a default data editor 1, 7 that is installed on the client computer is called and popped up depending on the data type of the cell. A list of the commercial or implemented data editors installed on the client computer is also provided to the user for selection. The data file of the cell is automatically retrieved from the remote database and uploaded into the data editor. The data editor facilities are used to edit the data file. The edited data file is sent back to the remote original database 11 through the networks 9.

Figure 2:
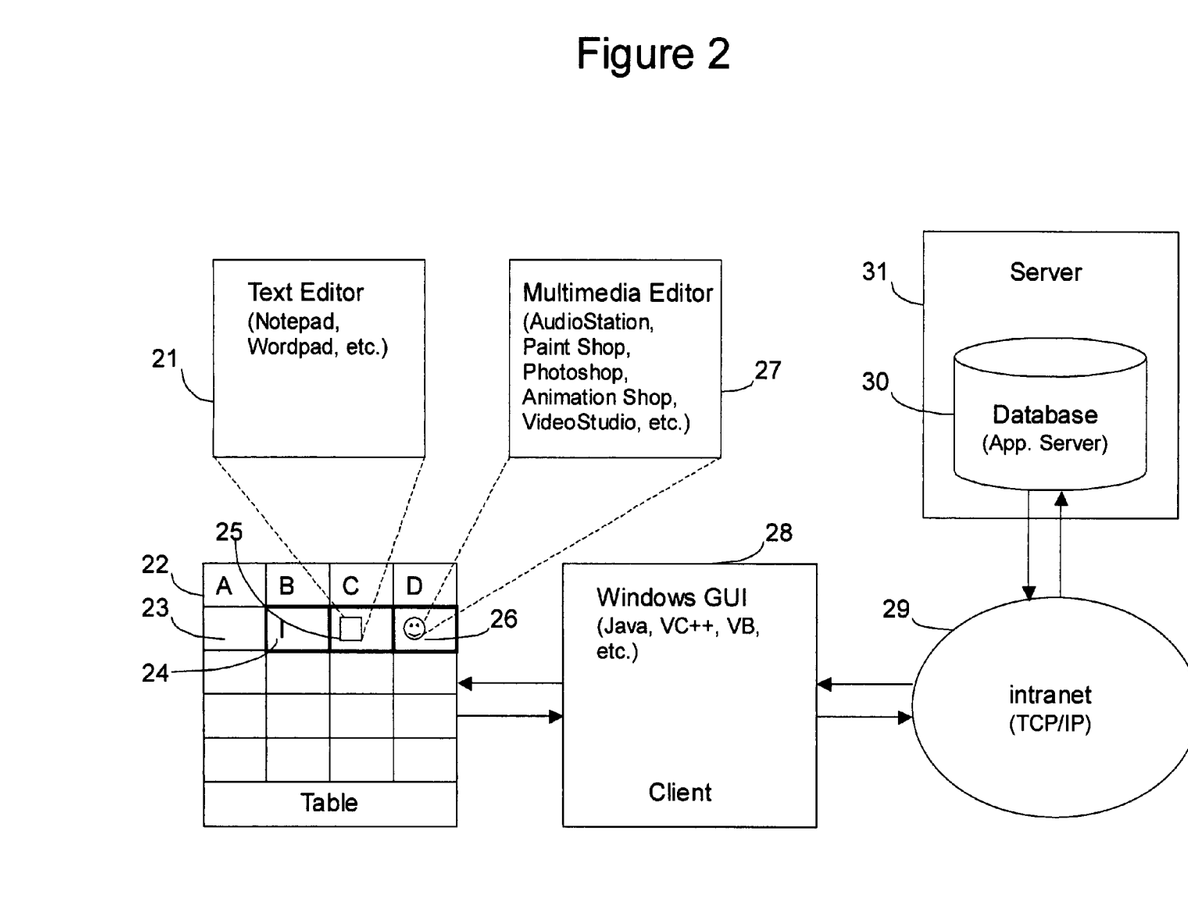
FIG. 2 is a schematic representation of the client/server version of the integrated database data editing system.

There are two implementation versions for the database data editing system of the present invention, a client/server version for intranet and a web version for Internet. FIG. 2 demonstrates the client/server, version of the editing system that is installed and run on the intranet 29. The server computer 31 contains a relational database with an application server 30 that supports the large text or binary data objects (LOBS). The client computer 28 sends query to the remote server computer with application server and database, and the database data is retrieved from the database and then sent back to the client. The database data is then materialized and displayed on the client forms 22. The data cells 23 of the table form are defaulted as read-only. When the mouse single-clicks a cell of the table, the data of the cell 24 is directly edited by the action of inserting, overwriting, deleting, copying and pasting. For the large text data and binary data types, the table cells display the small icons 25, 26 without actual data materialized to the client computer as default. When the user double-clicks the cell icons 25, 26, a default commercial or implemented text editor 21 or a multimedia editor 27 is called and popped up from the local client computer. The data is then retrieved from the remote server database to the client computer and automatically uploaded into the popped-up data editor. A list of the available data editors on the local client computer can be popped up for the user to select. When the data editing is finished, the editor directly saves and sends the data back to the remote original database through the intranet.

Typically, there are several commercial data editors 21, 27 installed on the client computer, such as the Notepad and Wordpad (Microsoft) for editing large text (ASCII) or character data files, the AudioStation 32 (Voyette Turtle Beach, Inc.) for editing audio data, the Paint Shop (Microsoft) and Photoshop (Adobe Systems, Inc.) for editing images and pictures, the Animation Shop (Jacs Software, Inc.) for editing animations, and the VideoStudio (Ulead Systems, Inc.) for editing video data files. Actually, there are many other commercial data editing software products available on the market and can be selected as the data editors for the database data editing system of the present invention. These text editors and multimedia editors are also implemented and deployed together with the integrated database data editing system in the present invention as well.

The client computer Window GUIs 28 are implemented by using Java technologies including JavaSE (Java Standard Edition) and JavaME (Java Mobile Edition), or alternately by using Visual C++, Visual Basic, etc. The client computer GUI forms access and communicate with the server computer application server and database by using TCP/IP based protocols through a single computer port or a set of computer ports, or alternatively by using UDP/IP based protocols through the intranet 29. The JDBC/ODBC (Java DataBase Connection/Open DataBase Connection) bridge and SQL (Structured Query Language) are used to retrieve and pass database data between the application server and the database, or alternately between the client computer GUI forms and the server database. The JDBC driver is created by bridging the JDBC to ODBC as a JDBC/ODBC bridge, or by directly connecting the JDBC to the database. The JDBC and the DataBase Management System (DBMS) also contain some built-in methods, functions and procedures to process the large text or binary data files.

FIG. 3 further demonstrates the detail components and mechanisms of the major client Windows GUI forms of the database data editing system of the present invention. The Database Data Manger form 41 contains a Header Panel 42 and a Detail Panel 43 as well as the Menu lists and Icon buttons on the top of the form. The Header Panel lists the databases and the database tables for each database. The Detail Panel lists several major tools and utilities including the DB Designer, Entity Relationship (ER) Designer, Table Designer, Database Schema, Data Filter, SQL Console, etc. When a database name listed on the Header Panel is double-clicked by the mouse, the Detail Panel is displayed for the database. When a tool or utility name on the Detail Panel is double-clicked by the mouse, a form for the tool or utility is displayed. The DB Designer is used to create and modify a database and the tables. The ER Designer is used to design, display and edit the database entity relationship. The Table Designer is used to design and edit the table data structure. The DB Schema edits and displays the database data structure and micros. The Data Filter is used to select a subset of the data from a table or tables of the remote database. The SQL Console is used to write and execute SQL query directly to the remote database. When a database table listed on the Header Panel is double-clicked, the table is displayed as a Single Document Interface (SDI) table 44. When the multiple tables are double-clicked on the Header Panel, the database tables are displayed as the Multiple Document Interface (MDI) tables 45 simultaneously. The table contents are retrieved from the remote database and displayed on the client screen as either a SDI table or MDI tables. The MDI tables display the data of multiple tables concurrently, which are useful to compare the data among the different tables. An MDI table is activated by clicking the table form and the table form is displayed on the front screen. The data of a table cell is edited as the mechanisms stated above by either directly editing on the cell or on the popped-up commercial or implemented data editor 46, 47, 48, 49.

Figure 4:
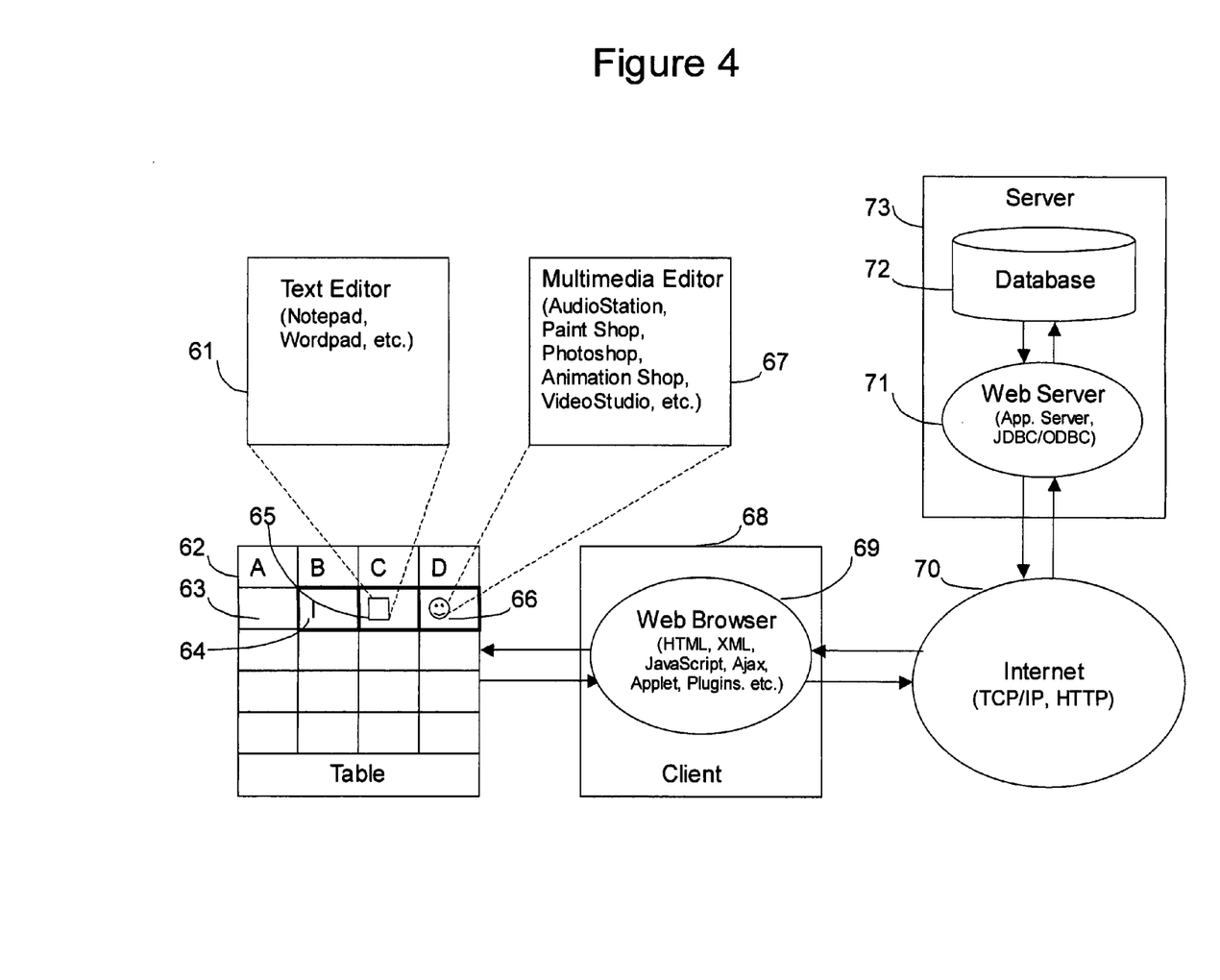
FIG. 4 is a schematic representation of the web version of the integrated database data editing system.

The web version of the database data editing system of this invention is demonstrated by FIG. 4. The web editing system consists of a computer server 73 containing a database 72 and a web server with an application server 71, and a computer client 68 containing a web browser 69. The client computer browser communicates with the web server and application server by HTTP or TCP/IP through a single computer port or a set of computer ports through Internet 70. When the client browser sends a request to the web server, the web server communicates with the application server and database and then replies to the client browser. The database data is passed by the web server and application server between the browser and the database. The system is implemented mainly by using Java, plugin and web technologies. The HTML (HyperText Markup Language), DHTML (Dynamic HTML), XML (eXtensible Markup Language), JavaScript, Ajax (Asynchronous JavaScript and XML), plugins and Java Applets are used to implement the web pages forms. The Java Servlets, JSP (Java ServerPages)and JavaEE (Java Enperprise Edition) are used to implement the middle-ware, and the JDBC/ODBC and SQL are used to retrieve and transfer data between the web server, application server and the database.

The Database Data Manager web page, which is similar to the Database Data Manager form FIG. 3 (41) of the client/server version, comprises a Header Frame and a Detail Frame. The Header Frame contains a list of the databases and database tables for each database. The Detail Frame contains several tools and utilities such as the DB Designer, ER Designer, Table Designer, DB Schema, Data Filter, SQL console, etc. The functions of these tools and facilities are similar to those of the client/server version FIG. 3 (43). When a database name listed on the Header Frame is double-clicked by the mouse, the Detail frame for the database is retrieved and displayed from the remote web server. When a tool or utility listed on the Detail Frame is double-clicked, a new web page of the tool or utility is retrieved and displayed by the browser. When a table name listed on the Header Frame is double-clicked, a new web page 62 that contains the table data from the remote database is displayed. The user can double-click multiple table names on the Head Frame and the multiple table web pages are displayed. The data on the table cells 63 are defaulted as read-only. When the user single-clicks a cell, the data of the cell 64 is directly edited by the action of inserting, overwriting, deleting, copying and pasting. The large text data type and binary data type is first displayed as a small icon 65, 66 in the table cell as the place holder without actual data. When the icon is double-clicked, a commercial or implemented data editor is called and popped up from the local client computer 61, 67. The data file is then automatically downloaded into the data editor from the remote database through the Internet 70. The database data is edited by using the facilities provided by the data editor. The edited data is saved and sent directly back to the original database 72 through the Internet.

The web version of the integrated database data editing system in the invention has more advantages compared to the client/server version. It is easier to implement the data security features by using the Public Key Infrastructure (PKI) and Secure Socket Layer (SSL). The firewall is also used to protect the server computer that contains the web server, application server and database. Further more, the web version of the integrated database data editing system can be deployed to any other networks besides Internet.

The user authentication and access control mechanisms are implemented for both the client/server version and the web version. A system administrator is granted the privilege to access all the objects of the integrated database data editing system and also has the privilege to assign a user to the user group with different levels of access ability. A user is only permitted to access a subset of the objects of the database data editing system by the system administrator. The user authentication and access control mechanisms in the present invention is designed to work seamlessly with those of the corresponding computer operating system and relational database.

In brief summary, the integrated database data editing system of this invention directly retrieves, edits, and saves the database data to the remote database through either wired or wireless intranet or Internet. The system provides an efficient, easy-to-use visual environment, graphic user interfaces and tools to manage and edit the database data contents, which is especially useful for the large text data type or large binary data type that is usually very difficult to handle. The system uses TCP/IP based server computer through a single computer port or a set of computer ports, which guarantees the reliability and security of data transmission through the intranet or Internet. The user authentication and access control mechanisms of the database data editing system are well implemented. The SSL (Secure Socket Layer), PKI (Public Key Infrastructure) and firewall technologies are used for secure data transmission through the networks.

What I claim as my invention is:

1. An integrated relational database data editing system providing a visual environment, graphic user interfaces and tools in a client computer to remotely access a server computer that contains a relational database and to manage and edit said database data contents through either intranet or Internet, and said system includes the following mechanisms and characters:
   (i) said client computer retrieves the database data from the remote server computer database, modifies, updates, input, output the data and then sends the data back to the original database;
   (ii) said client computer directly edits and modifies the database data without writing detail computer language codes in an efficient and easy-to-use manner;
   (iii) said client computer directly edits and modifies the large text data type and large binary data type by using a plurality of commercial text and multimedia data editors installed on the client computer;
   (iv) said database data editing system uses TCP/IP (Transfer Control Protocol/Internet Protocol) based connection-oriented network protocols to communicate between the client and server computers; and
   (v) said database data editing system implements user authentication and access control mechanisms which assigns different user groups with different privileges, wherein the database data editing system contains the well-defined graphic user interfaces and tools that display a database table or a subset data of a table and have the following characters:
   (i) said database data on each table cell is defaulted as read only;
   (ii) said database small text data on each table cell is directly edited when single-clicked by the mouse;
   (iii) said table cell contains a small icon as a place-holder for the large text data type or large binary data type;
   (iv) said commercial data editor is popped up from the local client computer when double-clicked the small icon of a table cell by the mouse and the database data is downloaded into the data editor from the remote server database and the edited data is then sent back to the original database when data editing is completed; and
   (v) said data editor is either a text editor or a multimedia editor depending on the database data type inside the table cell;
   Wherein a client/server version of the integrated database data editing system implemented by using Java technologies and deployed to the intranet; and
   Wherein a web version of the database data editing system implemented by using web and Java technologies and deployed to Internet and other network systems, and further has more advantages to implement the security features by using the PKI (public Key Infrastructure), SSL (Secure Socket Layer) and firewall.

2. An integrated relational database data editing system providing a visual environment, graphic user interfaces and tools in a client computer to remotely access a server computer that contains a relational database and to manage and edit said database data contents through either intranet or Internet, and said system includes the following mechanisms and characters:
   (i) said client computer retrieves the database data from the remote server computer database, modifies, updates, input, output the data and then sends the data back to the original database;
   (ii) said client computer directly edits and modifies the database data without writing detail computer language codes in an efficient and easy-to-use manner;
   (iii) said client computer directly edits and modifies the large text data type and large binary data type by using a plurality of commercial text and multimedia data editors installed on the client computer;

(iv) said database data editing system uses TCP/IP (Transfer Control Protocol/Internet Protocol) based connection-oriented network protocols to communicate between the client and server computers; and (v) said database data editing system implements user authentication and access control mechanisms which assigns different user groups with different privileges, wherein the database data editing system contains a Database Data Manager in the client computer comprising a Header Panel and a Detail Panel, which provides a user-friendly visual environment and tools to manage and edit the database data contents, and wherein the Header Panel of the Database Data Manager contains a list of databases and database tables for each database, and (i) a Detail Panel is popped up when double-clicked the database name; and (ii) a database table is popped up when double-'clicked the table name.

3. The Detail Panel of claim 2 further contain:

(i) a Database Designer for creating and modifying the database;

(ii) an Entity Relationship Designer for editing and managing the entity relationships of the database tables;

(iii) a Table Designer for designing and modifying the database tables;

(iv) a Database Schema for designing and modifying the database data structure and micros;

(v) a Data Filter for selecting a set of data from one or more database tables; and (vi) an SQL Console for writing and executing the SQL codes to the remote server database.

4. A client/server version of the integrated database data editing system of claim 2 is implemented by using Java technologies and deployed to the intranet.

5. A web version of the database data editing system of claim 2 is implemented by using web and Java technologies and deployed to Internet and other network systems, and further has more advantages to implement the security features by using the PKI (public Key Infrastructure), SSL (Secure Socket Layer) and firewall.

* * * * *